(12) United States Patent
Martin

(10) Patent No.: US 6,837,188 B1
(45) Date of Patent: Jan. 4, 2005

(54) TANGLE-PROOF COLLAR ASSEMBLY

(76) Inventor: Brian Martin, 1440 Derby La., Mundelein, IL (US) 60060

( * ) Notice: Subject to any disclaimer, the term of this patent is extended or adjusted under 35 U.S.C. 154(b) by 0 days.

(21) Appl. No.: 10/771,018

(22) Filed: Feb. 3, 2004

Related U.S. Application Data

(60) Provisional application No. 60/497,968, filed on Aug. 26, 2003.

(51) Int. Cl.[7] .............................................. A01K 27/00
(52) U.S. Cl. ....................... 119/792; 119/795; 119/858; 119/863
(58) Field of Search .................................. 119/856, 858, 119/863, 865, 784, 785, 792, 795, 770; 273/DIG. 19, 625, 615, 614, DIG. 52

(56) References Cited

U.S. PATENT DOCUMENTS

| | | | |
|---|---|---|---|
| 3,004,519 A | * 10/1961 | Weissman | 119/857 |
| 3,721,216 A | * 3/1973 | Lippe et al. | 482/81 |
| 5,080,045 A | * 1/1992 | Reese et al. | 119/795 |
| 5,485,811 A | 1/1996 | Jacobsen et al. | |
| 5,511,515 A | 4/1996 | Brown et al. | |
| 5,732,662 A | 3/1998 | Jacobsen | |
| 5,740,764 A | 4/1998 | Jacobsen | |
| 6,085,694 A | 7/2000 | Simon | |
| 6,374,777 B1 | 4/2002 | Willinger | |
| 6,453,851 B1 | 9/2002 | Holt, Jr. et al. | |
| 6,520,290 B1 | * 2/2003 | Carter | 182/36 |
| 6,530,345 B2 | 3/2003 | Donze | |

OTHER PUBLICATIONS

Prusia—US patent Publication US 2002/0035968A1.
Walter—US patent Publication US 2003/0029388A1.

* cited by examiner

Primary Examiner—Michael J. Carone
Assistant Examiner—T. Nguyen
(74) Attorney, Agent, or Firm—Raymond N. Ervin, Ltd.; Raymond Nathaniel Ervin

(57) ABSTRACT

A TANGLE-PROOF COLLAR ASSEMBLY for restraining pets and various animals. Each embodiment utilizes a channel mounted on an annular band. The channel forms an arcuate path about the periphery of the band wherein a swivel truck assembly having 360° biaxial rotation may travel within the arcuate path of the channel. An attachment for the leash is provided on the swivel truck. Each embodiment employs a locking mechanism for securing the collar in a suitable manner to maintain the arcuate path. Additional embodiments are described that provide for a rigid collar, which may be adjusted by the addition or removal of sizing elements or sections and an alternate locking assembly. An embodiment of a harness based upon the present invention is also described.

40 Claims, 3 Drawing Sheets

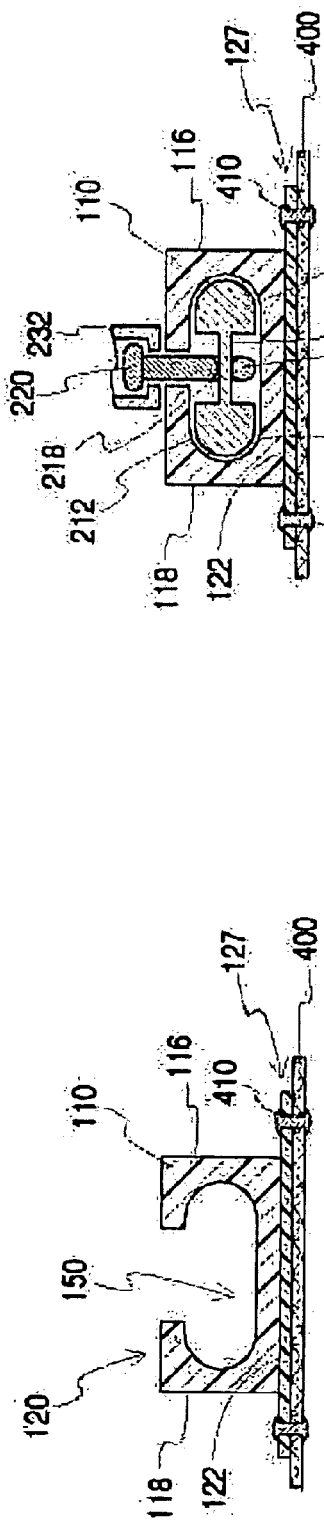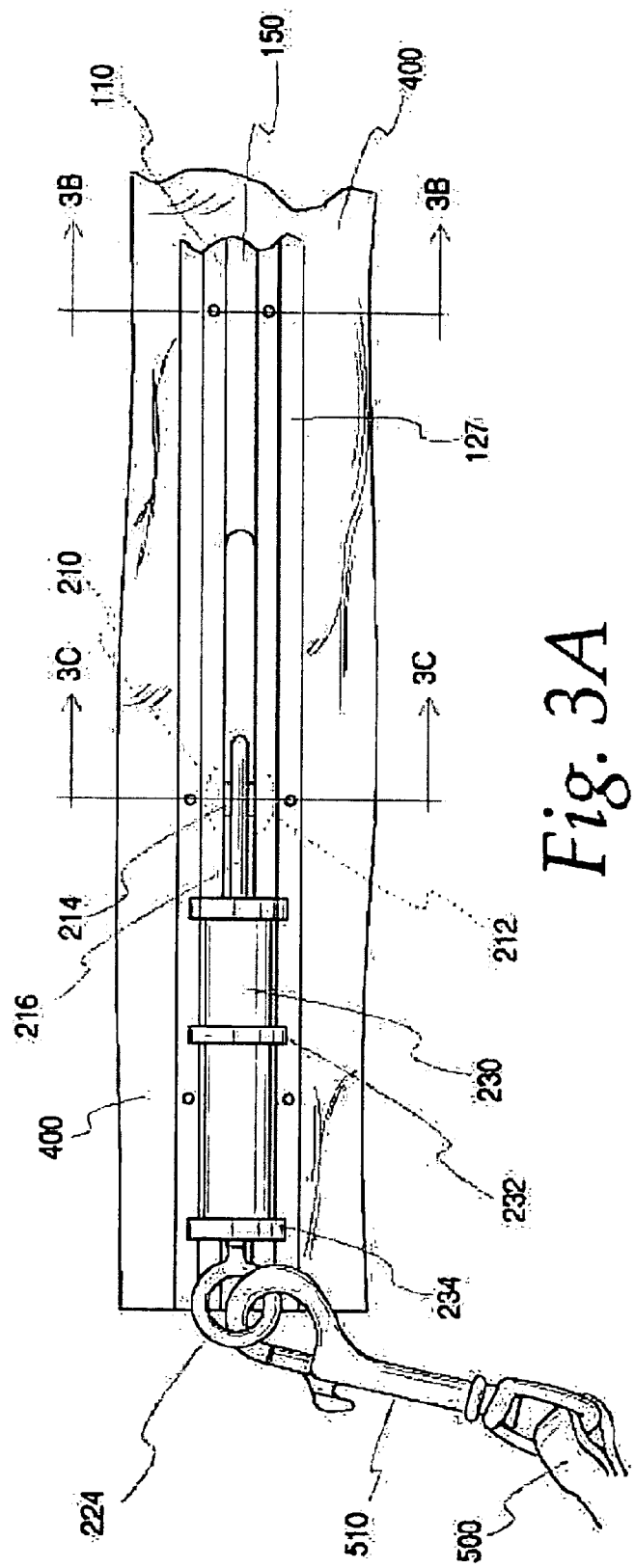

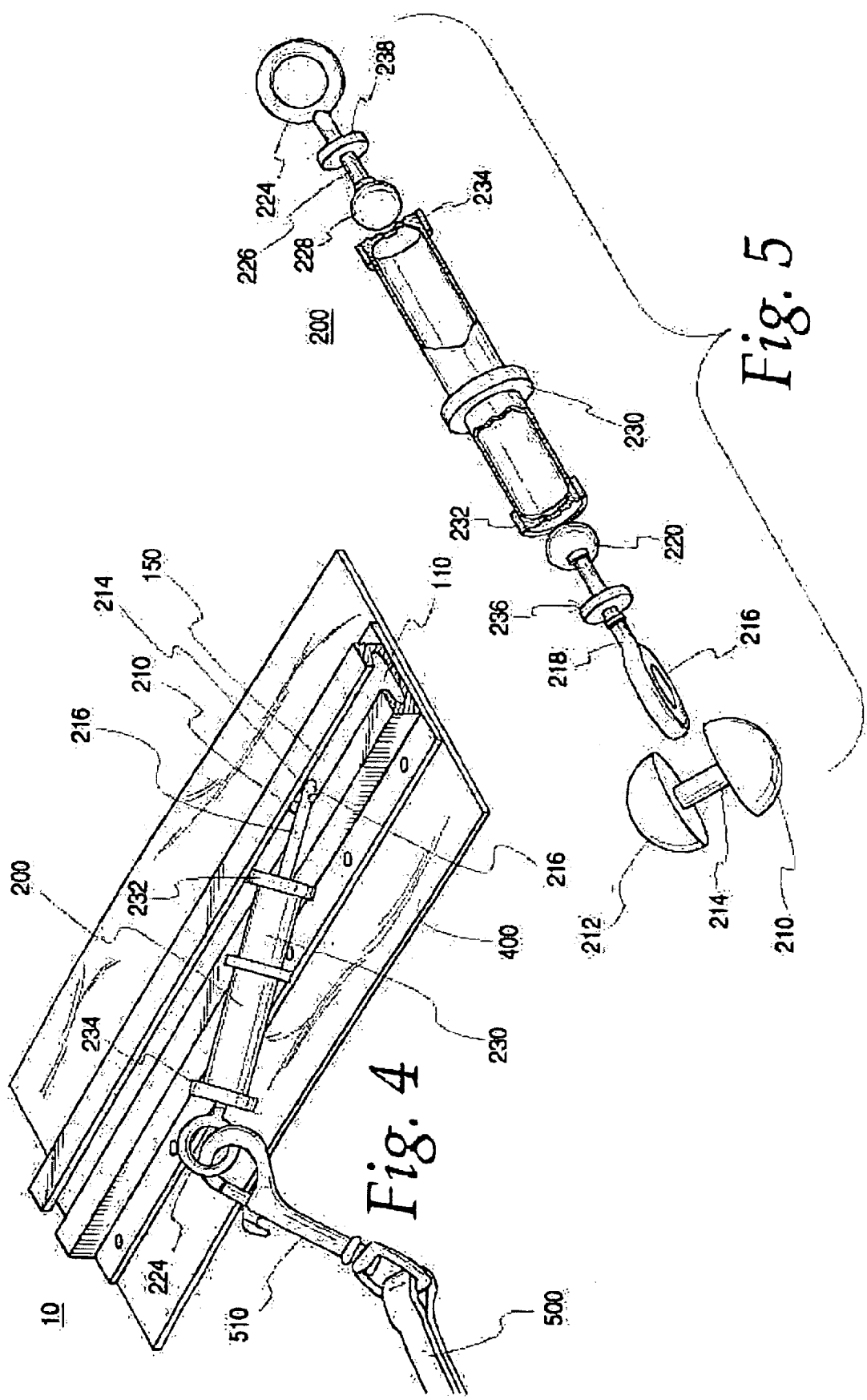

TANGLE-PROOF COLLAR ASSEMBLY

CLAIM FOR PRIORITY OF INVENTION

This application claims the benefit of U.S. Provisional Application No. 60/497,968, Tangle-Proof Collar Assembly, filed 26 Aug. 2003.

BACKGROUND OF THE INVENTION

1. Field of the Invention

The present invention specifically relates to a TANGLE-PROOF COLLAR ASSEMBLY capable of accommodating pets and various animals and a method of use wherein restraint of the pet or animal is desirable.

2. Description of the Related Art

The safe and effective means for restraint and control of pets and various animals has long posed a problem to those charged with handling these animals. Typical restraint systems generally consist of a collar or harness, which is bound to the neck or upper torso of the animal and a leash or tether, which is detachably connected to the collar or harness. In the case of restraining devices that make use of the collar as a point of attachment, the collar poses the risk of infection by damaging the skin and hair of the animal's neck through the process of abrasion and debridement. This is a function of the collar being rotated about the animal's neck during restraint or tension imposed by the leash or tether. When the collar is bound about the animal's neck with adequate slack to allow it to move freely in either direction, the collar has a tendency to bind on the skin or hair of the animal. Given the momentum of the collar about the axis of the animal's neck, the collar may extract hair or debride the skin, which in turn leaves a wound subject to infection for parasites and microbial organisms. Several attempts to overcome this problem have been made, such as the use of a padded backing on the collar that conceals the means of attachment. However, this improvement still fails to maintain the collar in a stationary position wherein the animal's skin and hair are no longer subjected to such forces. In the case where the collar is designed to be adjusted about the neck of the animal to be stationary or exhibit limited rotation to overcome the mechanical problems of chafing associated with rotating collar designs, a new problem of discomfort and potential for choking are presented. In cases where the animal may be untrained and frisky, the potential for harm to the animal is exacerbated and the very issues that such designs attempt to address may in fact increase the likelihood of injuries ranging from dermatitis, mechanical alopecia, musculoskeletal injuries to asphyxia. In two such cases, this design as demonstrated in U.S. Pat. No. 5,511,515 Brown, et al and U.S. Pat. No. 6,085,694 Simon, wherein the ability to inflict pain and discomfort upon an animal is considered a useful and essential element for training an animal.

The shortcoming of such collar based restraint designs appears to suggest that the use of a restraint that concentrates the point of force about a single point of the animal's anatomy is incapable of overcoming these concerns. This becomes most apparent when these forces are compounded by the normal torque forces, which are applied directly to the collar by the leash, wherein these forces demonstrate a variance of the axial plane, established between the collar and the neck of the restrained animal. This may distinguish itself as accelerated wear on the distal circumferential edges of the collar that correspond to associated dermal injuries. This has served as the impetus for tangle-proof leash designs typified by U.S. Pat. No. 5,740,764 Jacobsen, which offset the torque and rotation forces that complement the axial forces incident to the use of the collar restraint. Though this design satisfactorily accommodates the torque and rotational forces that serve to further aggravate the issue of the collar restraint, the design is silent in respect to resolving the issue of axial rotation of the collar about the neck of the animal. It would be desirable to have a means of providing safe, convenient and reliable restraint while minimizing the possibility of risk of injury to the animal.

In a further attempt to provide a means of restraint absent the issue of concentrating the controlling force about the focus of the neck of the animal, the harness was developed. Unlike the collar, the harness distributes the controlling force about the body of the animal, in most cases the neck, front legs and torso. However, the harness still suffers the drawbacks of the collar with regard to chafing the skin of the animal at those points of contact wherein the controlling force is maximized. Harness restraint systems are generally bulky and require additional effort on the part of the individual handler to adequately adjust and fit the animal. Furthermore, because the point of attachment for a leash is fixed on the harness, the individual handler is often frustrated in attempting to control high-spirited animals that are best served by the use of such a restraint, due to having to combat both the animal and the handler becoming ensnarled in the leash. Another approach has been to utilize a harness with a rigid or semi-rigid leash fitted at both the handle and the point of attachment to the harness with swivels, capable of rotating 360° about the axis of the leash. This approach does have some limited success in addressing the issue however, the individual handler is presented with a much reduced lead distance from the animal, and most significantly the individual handler is more directly subjected to the erratic motions of the animal in regard to the movement of the animal in a parallel vector to the axis of the leash. Given the size of the animal and the intensity of the ascribed movements, such a system could be rendered ineffective.

Another fault of the aforementioned collar and harness restraint systems are the difficulty they respectively pose to the individual that must employ them routinely to handle an animal. Though the collar restraint and leash present the simplest means to fit and adjust to the animal, given the range of possible motion the animal may present subject to its temperament, the individual handler may be forced to consistently untangle the leash during the period of use. In the case of those individual handlers that may use a harness in conjunction with a leash, they are presented with increased effort in properly securing and adjusting the harness to the animal in addition to being confronted with managing the leash to prevent binding and tangles. A device for restraining pets and animals that could eliminate these concerns would be of great advantage to a user.

There is a need to have a tangle-proof collar assembly, which overcomes the collective disadvantages posed by each of the above approaches in the handling of pets and various animals. The present invention satisfies such a need.

SUMMARY OF THE INVENTION

The present invention, a tangle-proof collar assembly relates to an apparatus for providing restraint and control of various animals, while simultaneously reducing the risk of both direct and indirect injury to the animal while the individual handler may enjoy greater ease of handling the animal by eliminating tangles and preventing either the individual handler or animal from being ensnared. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

A first aspect of the invention provides a tangle-proof leash and harness for restraining an animal wherein:

a collar formed by at least one flexible channel of a given length, having a first and second end, which upon being securely adjoined by a latch assembly form an arcuate path having a substantially smooth continuous raceway surface that retains a swivel truck assembly. The swivel truck assembly may be comprised of two hemispheres joined by an axle, which may be connected by a pintle having a yoked end and ball end. The ball end is received by a shaft first end having a ball receptacle and a first collet to retain the ball end. A shaft second end opposite the shaft first end may have a ring to permit the attachment of a leash. In another embodiment, the shaft may be attached to gimbals via a connecting shaft. The hemispheres and the rod of the swivel truck assembly are joined in a manner that permits the hemispheres to move independently. The swivel truck assembly maintains communication with the arcuate path throughout its travel around the collar, and may rotate in both a normal or parallel plane to the axis of the collar. The ring whereby the leash is attached to the collar may employ gimbals to offset torque forces developed in the leash from being transmitted to the collar. The collar being affixed to a flexible pad and bound about the neck of the animal in such a fashion as to comfortably limit the movement of the collar about the neck of the animal. In another embodiment of the invention, the circumference of the collar may be adjusted by removing a portion of one or both of either the first or the second end of the channel to achieve the appropriate length.

A second aspect of the invention provides a tangle-proof leash and collar for restraining an animal wherein:

a collar formed by at least two hingable rigid channels, which upon being securely adjoined form an arcuate path having a substantially smooth continuous raceway surface that retains a swivel truck assembly, which is comprised of two hemispheres separated by a rod having a ring to permit the attachment of a leash. The hemispheres and the rod of the swivel truck assembly are joined in a manner that permits the hemispheres to move independently. The swivel truck assembly maintains communication with the arcuate path throughout its travel around the collar, and may rotate in both a normal or parallel plane to the axis of the collar. In another embodiment, the ring whereby the leash is attached to the collar may employ gimbals to offset torque forces developed in the leash from being transmitted to the collar. The collar is affixed to a flexible pad and bound about the neck of the animal in such a fashion as to comfortably limit the movement of the collar about the neck of the animal.

A further embodiment of the invention, provides a tangle-proof harness for restraining an animal wherein a harness is configured to accommodate the torso of an animal, having a harness leash ring formed by at least two hingable rigid channels, which upon being securely adjoined form an arcuate path having a substantially smooth continuous raceway surface that retains a swivel truck assembly. The harness leash ring is further affixed to a flexible pad and bound about the torso of the animal in such a fashion as to comfortably limit the movement of the harness leash ring about the torso of the animal. A third aspect of the invention provides a size adjustment mechanism over a given range with an integrated lock assembly for securing the collar or harness ring for restraining an animal wherein:

a collar or harness ring is formed by at least an even number of four sections of rigid channel, when joined form an arcuate path having a substantially smooth continuous raceway surface, when joined form an arcuate path having a substantially smooth continuous raceway surface that retains a swivel truck assembly. The circumference of the collar may be adjusted by the addition or removal of an even number of sizing elements (extension sections) corresponding to the number of sections comprising the collar. The sections of the collar and the sizing elements may be secured by a locking mechanism comprising a pin of a given shape having at least one spring loaded protrusion located at one end, sized and shaped to be received in a hole in each of the sections of collar, wherein the hole may be formed at a normal angle to the channel. The sections of collar may be aligned wherein the pin may be inserted through the holes and the spring loaded protuberance may retard the release of the pin until adequate force is applied to the protuberance to force it to be compressed into a recess in the pin and the pin subsequently withdrawn.

BRIEF DESCRIPTION OF THE DRAWINGS

FIG. 3A is a top view of a section of the tangle-proof collar, channel and swivel truck assembly in accordance with the present invention.

FIG. 3B is a sectional front view of the tangle-proof collar channel and flexible pad in accordance with the present invention.

FIG. 3C is a sectional front view of the tangle-proof collar channel, flexible pad and swivel truck assembly in accordance with the present invention.

FIG. 4 is a perspective view of a section of the tangle-proof collar channel and swivel truck assembly, in accordance with the present invention.

FIG. 5 is an exploded view of the swivel truck assembly, in accordance with the present invention.

DETAILED DESCRIPTION OF THE PRESENTLY PREFERRED EMBODIMENTS

FIGS. 1–5 illustrate the present embodiment of a tangle-proof collar assembly in accordance with the present invention.

Figure 1:
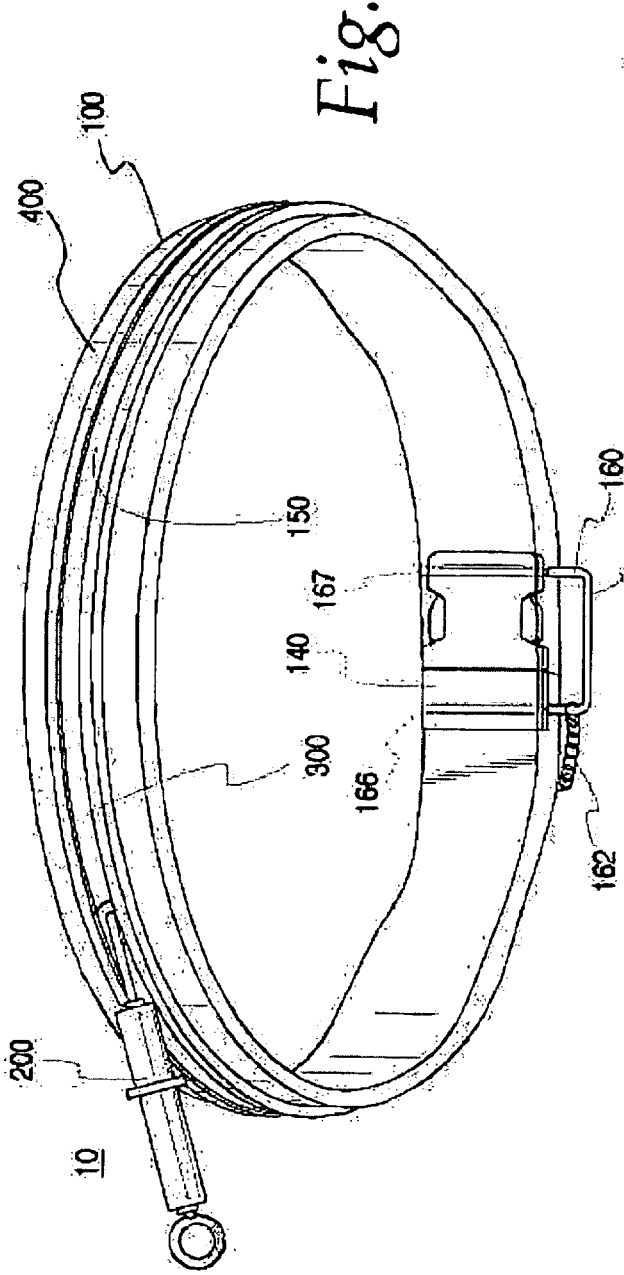
FIG. 1 is a perspective view of the tangle-proof collar assembly wherein the ends of collar assembly are engaged, in accordance with the present invention.

Referring to FIG. 1, a drawing in perspective view of one embodiment of a tangle-proof collar assembly is generally shown at number 10. The tangle-proof collar assembly 10 of the present invention generally comprises a collar 100, an integrated latch assembly 140, a secondary latch assembly 160, a swivel truck assembly 200, a debris shield 300 and a flexible pad 400.

Referring to FIGS. 2, 3A, 3B, 3C and 4, one embodiment of the collar of the tangle-proof collar assembly 10 is generally shown at number 100. The collar 100 comprises a channel 110 having a first end 112, a second end 114, a first side 116, a second side 118, a topside 120 and a bottom side 122. The channel 110 is formed into a ring when the first end 112 and second end 114 of the channel 110 are joined by the integrated latch assembly 140 (FIG. 1). The channel 110 includes a slotted circumferential opening formed in the topside 120 in communication with an internal raceway 150 having a smooth continuous arcuate path (raceway).

The channel 110 is constructed of any suitable material capable of providing the tensile strength and rigidity required to restrain an unruly animal under the rigors imposed in handling without significant deformation or damage to the tangle-proof collar assembly 10. The channel 110 material of construction must be capable of exhibiting a reasonable degree of corrosion resistance to exposure to the elements of weather, soaps and various chemical agents used to care for the animal, and bodily fluids of the animal that may encounter the channel 110, such as, for example plastic, composite materials, metal, and so on. The channel 110 shall be of a given length, depth and width in direct proportion to the forces anticipated for an animal of a given type, size and weight, in consideration of this aspect of the channel 110. Allowance will be made to ensure adequate hardness of the raceway 150, to prevent galling and indentation during use or circumstances wherein extreme forces are encountered. This may be accomplished by the application of hardened surface treatments such as gas deposition, chemical, mechanical insertion, weldable or castable wear surfacing, for example. The raceway 150 may be subsequently polished by any means recognized in the Mechanical Arts to produce a smooth continuous surface substantially free of defects. In another embodiment, the channel 110 may be of rigid construction having at least two sections wherein the adjacent sections may be hinged by any means known in the Mechanical Arts wherein the hinge does not impose upon the smooth arcuate path and the alignment of the sections may be maintained. In another variant the channel 110 is formed of rigid construction having an even number of at least four sections, wherein the circumference of the channel 110 may be varied within given limits by the addition of a number of extension sections equal to the number of sections of channel 110. The extension sections may be incorporated into the channel 110 by mating male and female latches to the corresponding latch found on the channel sections, to increase the size of the channel within given operational parameters requiring the continuity of the arcuate path to be substantially maintained. The sections of the channel 110 and the extension sections are further secured by a secondary latch assembly 160 comprising a retaining pin 161 of a given shape having at least one spring loaded protrusion 164 located at the end, which is received in a hole in each of the extension sections and corresponding ends of the channel 110, wherein the a hole may be oriented at a normal angle to the channel 110. The sections of collar 100 are aligned wherein the retaining pin 161 is inserted through the holes and the spring loaded protrusion 164 retards the release of the retaining pin 161 until adequate force is applied to the spring loaded protrusion 164 to force it to be compressed into a recess in the retaining pin 161 and the retaining pin 161 subsequently withdrawn.

In another embodiment, the channel 110 may be made adjustable over a given range by projecting the raceway profile a given length at one end of the channel while maintaining a substantially similar radius; and receiving the raceway profile into the opposite end of the channel, wherein the opposite end is slightly flared. The resultant channel will have an arcuate path having only a minor disruption wherein the travel of the swivel truck assembly 200 is unaffected. The channel 110 may then be secured utilizing a hinged spring latch having a ball end on a post to be received in a tapered slot in the bottom of the channel 110. In another embodiment the channel 110 may comprise flexible construction and have a slotted topside, which includes an internal wall defining a lateral "V"-shaped groove. In another embodiment the channel 110 may comprise flexible construction and have a slotted topside, which includes an internal wall defining an inverted "T"-shaped groove.

Referring to FIGS. 3A, 3C, 4 and 5, one embodiment of a swivel truck is generally shown at number 200. The swivel truck assembly 200 comprises a first roller bearing 210 and a second roller bearing 212 of hemispherical shape connected by a bearing axle 214 about a common axis perpendicular to equatorial axis of each bearing. In another embodiment of the swivel truck assembly 200 the first roller bearing 210 and second roller bearing 212 may comprise any given shape that affords substantial rotary agreement with the raceway 150 (FIG. 3–4). The bearing axle 214 is mounted on a pintle yoke end 216 wherein the first roller bearing 210 and second roller bearing 212 simultaneously biaxially rotate 360° about both the hemispheres common axis and the axis of the pintle yoke end 216. In another embodiment the first roller bearing 210 and the second roller bearing 212 may have an conical shape and be connected by a bearing axle 214 about a common axis perpendicular to equatorial axis of each bearing; wherein the first roller bearing 210 and the second roller bearing 212 maintain substantial rotary contact with the flexible channel 110 internal wall defining a lateral "V"-shaped groove. In another embodiment the first roller bearing 210 and the second roller bearing 212 may have an conical shape and be connected by a bearing axle 214 about a common axis perpendicular to equatorial axis of each bearing; wherein the first roller bearing 210 and the second roller bearing 212 maintain substantial rotary contact with the flexible channel 110 internal wall defining an inverted "T"-shaped groove.

In another embodiment, the pintle yoke end 216 includes at least one shoulder and washer bearing traversing the upper portion of the raceway 150, whereby the strain on the pintle yoke end 216 is reduced. The first roller bearing 210 and second roller bearing 212 maintain substantial contact with the surface of the raceway 150 over the trek of the arcuate path of the raceway 150. The pintle yoke end 216 may be connected to the pintle shaft 218 of a given length and diameter, which terminates in a pintle ball end 220. The pintle ball end 220 is retained in a shaft 230 having a recess to accommodate the pintle ball end 220, whereby a ball-joint is formed which allows the pintle ball end 220 to freely rotate within the limitation of the given range of the ball joint. A first collet 232 is attached to shaft 230 by threads or other suitable mechanical means to retain the pintle ball end 220 (FIG. 3C). The shaft 230 includes a leash attachment ring 224 having a ball end retained in a shaft 230 having a recess to accommodate the ball end 228 of the leash attachment ring 224, whereby a ball-joint is formed which allows the leash attachment ring 224 to freely rotate within the limitation of the given range of the ball joint. A second collet 234 is attached to shaft 230 by threads or other suitable mechanical means to retain the leash attachment ring 224. A first pintle shaft stop 236 and a second pintle shaft stop 238 are respectively affixed to the pintle shaft 218 and the leash pintle shaft 226, to prevent the respective pintle ball 220 and leash pintle ball 228 from traveling beyond predetermined limits within the shaft 230.

In another embodiment, the swivel truck assembly may utilize gimbals to attach the leash attachment ring 224 to the shaft 230. The swivel truck assembly 200 is constructed of any suitable material capable of providing the tensile strength and rigidity required to restrain an unruly animal under the rigors imposed in handling without significant deformation or damage to the tangle-proof collar assembly 10. The swivel truck assembly 200 circumferentially traverses about the collar 100 (FIG. 1), riding on arcuate path of the internal raceway 150 of the channel 110. The swivel truck assembly 200 serves as a means to attach the leash to the tangle-proof collar assembly 10, and also provides a means to move the swivel components from the leash and place these on the collar 100 (FIG. 1), wherein the various torque and twisting forces can be offset before transmission to either the handler or the animal.

Referring to FIG. 1, a debris shield is generally shown at number 300. The debris shield 300 comprises any flexible polymer having Shore A durometer values in the range of about 20 to 100 or any suitable durometer value capable of maintaining the shape of the structure as contemplated by the invention, exhibit good abrasion resistance and a low coefficient of friction. The debris shield 300 envelops the collar 100, swivel truck assembly 200, integrated latch assembly 140 and secondary latch assembly 160. The debris shield 300 is attached to the channel first side 116 and the channel second side 118 of the channel 110.

In another embodiment, the debris shield 300 has a profile that is received by a corresponding cooperating profile on the channel first side 116 and the channel second side 118 of the channel 110. The debris shield 300 may also be formed to fit into the slotted circumferential opening about the topside 120 of the channel 110. The debris shield 300 serves to prevent dirt, grit, hair and various contaminants from fouling the raceway 150 and swivel truck assembly 200. In performing this function the debris shield also acts to protect the hair of the animal, in the immediate proximity of the collar 100 from being caught and subsequently forcibly extracted.

Referring to FIGS. 3A, 3B and 3C a flexible pad is generally shown at number 400. The flexible pad 400 may be formed of a band of leather, vinyl, fabric or any other material of a given tensile strength contemplated by the invention, having a topside and bottom side, being of a given thickness, width and length. The flexible pad 400 may utilize rivets 410 or any other suitable mechanical faster to attach the channel 110 (FIGS.2–4) by securing the channel attachment tabs 127 to the topside of the flexible pad 400.

In another embodiment, the flexible pad 400 is padded to provide additional comfort for the animal. In another embodiment of the invention, the flexible pad 400 may be configured into a harness arrangement, whereby straps may be attached to secure the flexible pad 400 to the torso of the animal. In one variant thereof, the flexible pad 400 also serves as a secondary restraint in the event of failure of the tangle-proof collar assembly 10, wherein hook and loop fasteners or any other suitable mechanical fastener may be employed to retain the flexible pad 400.

Figure 2:
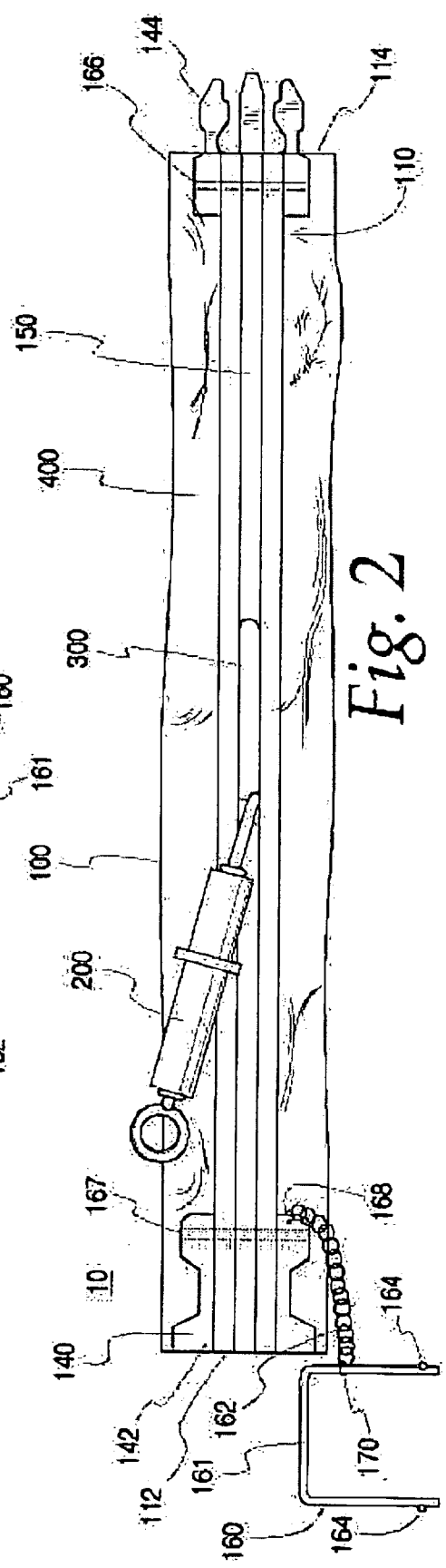
FIG. 2 is a top view of the tangle-proof collar assembly wherein the ends of the collar assembly are disengaged, in accordance with the present invention.

Referring to FIGS. 1 and 2 an integrated latch assembly is generally shown at number 140. The integrated latch assembly 140 comprises a second end latch tab 144 and a first end tab catch 142 respectively attached to the second end 114 and the first end 112 of the channel 110. The second end latch tab 144 and the first end tab 142 respectively have a second end tab bore 166 and a first end tab catch bore 167, in a plane normal to the channel 110 (FIGS. 3A–4), whereby the secondary latch retainer 161 is received. The integrated latch assembly 140 is located between the raceway 150 (FIGS. 3A–4) and the channel 110 bottom side 122 (FIGS. 3B–3C), such that the integral latch assembly 140 does not interrupt or protrude into the arcuate path of the raceway 150. It will be understood that the integrated latch assembly 140 may be any mechanical fastener capable of securing the channel 110 in substantial alignment, without significant compromise of the strength and integrity of the channel 110. The integrated latch assembly 140 may also have a recessed pushbutton means to provide a convenient means for the handler to place and remove the collar 100 on the animal.

In another embodiment, the integrated latching assembly 140 comprises a lock mechanism including a spring loaded pin located in one end of the collar 100 having a keyway with a recess cut at a normal angle to receive a spring loaded plunger of a given shape located on the corresponding end of the collar 100.

Referring to FIGS. 1 and 2 a secondary latch assembly is generally shown at number 160. The secondary latch assembly 160 comprises a retaining pin 161, having a secondary latch retainer 162 attached at one end to the retaining pin 161 by a latch retainer connector 170 and to a channel retainer anchor 168, which is connected to the channel 110 (FIGS. 3A–4) at the opposite end. The secondary latch retainer 162 may be constructed on any material of construction capable of exhibiting the tensile strength, durability, corrosion resistance and structural properties contemplated by the present invention. The retaining pin 161 may have a given shape and geometry to afford it to engage the channel 110 to avoid interruption of the arcuate path of the raceway 150 (FIGS. 3A–4). The retaining pin 161 further comprises a recess located at least one end wherein a spring loaded retard protrusion 164 may be located. The second end latch tab 144 and the first end tab 142 may respectively have a second end tab bore 166 and a first end tab catch bore 167, in a plane normal to the channel 110, wherein the retaining pin 161 is inserted through the bores and the spring loaded protrusion 164 may retard the release of the retaining pin 161. Until adequate force is applied to the spring-loaded protrusion 164 to force it to be depressed into the recess in the retaining pin 161, the retaining pin 161 may not be withdrawn.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A tangle-proof collar assembly for handling and restraining animals comprising:

at least one channel of a given length, having a first and second end, a first side, a second side, a bottom side, a slotted top side, an internal raceway; wherein the second and first end are securely adjoined by an integrated latch assembly to form an arcuate path having a substantially smooth continuous raceway surface, and a swivel truck assembly, which is comprised of at least one biaxially rotative spindled bearing element connected to a yoked pintle shaft having a first yoked end to which the spindled bearing is attached; and a second pintle end having a given shape being received by a sleeve having a first sleeve end to which the second pintle end is rotatively secured by a first collet, and a second sleeve end to which a shaft having a ring to attach a leash; the swivel truck assembly permits the spindled bearing to rotate biaxially while in communication with the arcuate path through out the circumference of the collar, and a flexible pad having a topside and bottom side, of a given tensile strength, being of a given thickness, width and length comprising a retaining device incorporated into the body of the flexible pad, and at least one mechanical fastener to attach the channel to the topside of the flexible pad, and an integrated latch assembly comprised of a male end and female end being each respectively adjoined to one of either first and second ends of the channel.

2. The tangle-proof collar assembly of claim 1 further comprising a debris shield comprising a flexible material that covers the exposed surfaces of the channel, raceway, and swivel truck assembly, that is slidably attached to the channel first side and second side.

3. The tangle-proof collar assembly of claim 2 wherein said channel further comprises a profile incorporated into at least one of either the channel first side and second side, and said debris shield further comprises a corresponding profile whereby, the profile in one of either the channel first side and second side is received by the respective profile of said debris shield.

4. The tangle-proof collar assembly of claim 1 wherein the channel further comprises a flexible channel.

5. The tangle-proof collar assembly of claim 1 wherein the channel further comprises a rigid channel, divided into at least two sections in a plane normal to the circumference of said collar, having at least one hinged element attached to the bottom side of adjacent sections of said collar.

6. The tangle-proof collar assembly of claim 1 wherein the channel further comprises a rigid channel, divided into at least four even sections wherein each section has a first and second end wherein, one of either said integrated latch assembly male end and female end is incorporated, wherein said section mates with one of either corresponding first and second end to form a circuitous structure.

7. The rigid channel of claim 6 further comprising a given corresponding even number of extension sections of rigid channel of a given arc length and a given cord length, each having a second and first end complete with one of either said integrated latch assembly male end and female end to attach to the corresponding section of rigid channel, which upon incorporation of all extension sections with said sections of rigid channel form an enlarged circuitous structure.

8. The tangle-proof collar assembly of claim 1, wherein the flexible pad further comprises a harness assembly affixed to said flexible pad wherein, the harness assembly has a retaining device incorporated into the structure having at least one mechanical fastener to attach said flexible pad to the harness assembly.

9. The harness assembly of claim 8 wherein the harness assembly is detachably attached to said flexible pad.

10. The tangle-proof collar assembly of claim 1, wherein the swivel truck assembly may further comprise two hemispheres connected by an axle passing through the yoked end of the pintle having a yoked end and ball end received by a shaft first end having a ball receptacle and a first collet to retain the ball end.

11. The tangle-proof collar assembly of claim 1, wherein the swivel truck assembly may further comprise a leash pintle shaft having a first leash attachment end to which the leash attachment ring is attached; and a second pintle end having a given shape being received by a sleeve having a second sleeve end to which the second pintle end is rotatively secured by a second collet.

12. The tangle-proof collar assembly of claim 1, wherein the swivel truck assembly further comprises a second sleeve end to which gimbals having a first gimbaled shaft are rotatively secured by a second collet, and a second gimbaled shaft having a ring to attach a leash.

13. The tangle-proof collar assembly of claim 1, wherein the integrated latching assembly comprises a spring loaded pin located in one end of said channel having a keyway with a recess cut at a normal angle to receive a spring loaded plunger of a given shape located on the corresponding end of said channel.

14. The tangle-proof collar assembly of claim 1, further incorporating a secondary latch assembly comprising at least one retaining pin of a given shape having a spring loaded retard protrusion located in at least one end wherein, said end is received in a bore normal to the channel, wherein the retaining pin is inserted through the bore and the spring loaded protrusion retards the release of the retaining pin.

15. A tangle-proof collar assembly for handling and restraining animals with a leash comprising:

an annular pad including first and second ends, an outer side and having a length suitable for encircling the neck of an animal;

a first latch for fastening said first and second ends together;

a channel disposed along the annular pad on said outer side, said channel including a slotted top side; and a swivel truck assembly including a first end having a sliding member slidably disposed in said slotted top side of said flexible channel, a second end opposite said first end including a fastening member for permitting attachment to a leash, and a pivot mechanism between said first and second ends to permit said first end to pivot with respect to said second end; wherein said sliding member is connected to a yoked pintle shaft having a first yoked end to which the spindled bearing is attached; and a second pintle end having a given shape being received by a sleeve having a first sleeve end to which the second pintle end is rotatively secured by a first collet, and a second sleeve end to which a shaft having a ring to attach a leash.

16. The tangle-proof collar assembly of claim 15 wherein said channel is flexible.

17. The tangle-proof collar assembly of claim 15 wherein said channel is rigid.

18. The tangle-proof collar assembly of claim 15 wherein said channel slotted topside includes an internal wall defining a "C"-shaped groove.

19. The tangle-proof collar assembly of claim 18 wherein said sliding member is a pair of hemispherical bearing halves connected by a rod and wherein said pair of bearing halves are disposed in said "C"-shaped groove.

20. The tangle-proof collar assembly of claim 15 wherein said channel slotted topside includes an internal wall defining a lateral "U"-shaped groove.

21. The tangle-proof collar of claim 20 wherein said sliding member is a pair of elliptical bearing halves connected by a rod and wherein said pair of bearing halves are disposed in said lateral "U"-shaped groove.

22. The tangle-proof collar assembly of claim 15 wherein said flexible channel slotted topside includes an internal wall defining a lateral "V"-shaped groove.

23. The tangle-proof collar assembly of claim 22 wherein said sliding member is a pair of conical bearing halves connected by a rod and wherein said pair of bearing halves are disposed in said lateral "V"-shaped groove.

24. The tangle-proof collar assembly of claim 15 wherein said flexible channel slotted topside and internal walls define an inverted "T"-shaped groove.

25. The tangle-proof collar assembly of claim 24 wherein said sliding member is a pair of cylindrical bearing halves connected by a rod and wherein said pair of bearing halves are disposed in said inverted "T"-shaped groove.

26. The tangle-proof collar assembly of claim 15 wherein the secondary latch assembly comprises a spring loaded pin located in one end of said channel having a keyway with a recess cut at a normal angle to receive a spring loaded plunger of a given shape located on the corresponding end of said channel.

27. The tangle-proof collar assembly of claim 15, wherein the annular pad further comprises a harness assembly affixed to said annular pad wherein, the harness assembly has a retaining device incorporated into the structure having at least one mechanical fastener to attach said annular pad to the harness assembly.

28. The harness assembly of claim 27 wherein the harness assembly is detachably attached to said annular pad.

29. The tangle-proof collar assembly of claim 27 wherein the secondary latch assembly comprises a spring loaded pin located in one end of said channel having a keyway with a recess cut at a normal angle to receive a spring loaded plunger of a given shape located on the corresponding end of said channel.

30. A tangle-proof harness assembly for handling and restraining animals with a leash comprising:
   an annular pad including first and second ends, an outer side and having a length suitable for encircling the torso of an animal;
   a first latch for fastening said first and second ends together;
   a channel disposed along the annular pad on said outer side, said channel including a slotted top side; and
   a swivel truck assembly including a first end having a sliding member slidably disposed in said slotted top side of said flexible channel, a second end opposite said first end including a fastening member for permitting attachment to a leash, and a pivot mechanism between said first and second ends to permit said first end to pivot with respect to said second end; wherein said sliding member is connected to a yoked pintle shaft having a first yoked end to which the spindled bearing is attached; and a second pintle end having a given shape being received by a sleeve having a first sleeve end to which the second pintle end is rotatively secured by a first collet, and a second sleeve end to which a shaft having a ring to attach a leash.

31. The tangle-proof collar assembly of claim 30 wherein said channel is flexible.

32. The tangle-proof collar assembly of claim 30 wherein said channel is rigid.

33. The tangle-proof collar assembly of claim 30 wherein said channel slotted topside includes an internal wall defining a "C"-shaped groove.

34. The tangle-proof collar assembly of claim 33 wherein said sliding member is a pair of hemispherical bearing halves connected by a rod and wherein said pair of bearing halves are disposed in said "C"-shaped groove.

35. The tangle-proof collar assembly of claim 30 wherein said channel slotted topside includes an internal wall defining a lateral "U"-shaped groove.

36. The tangle-proof collar of claim 35 wherein said sliding member is a pair of elliptical bearing halves connected by a rod and wherein said pair of bearing halves are disposed in said lateral "U"-shaped groove.

37. The tangle-proof collar assembly of claim 30 wherein said flexible channel slotted topside includes an internal wall defining a lateral "V"-shaped groove.

38. The tangle-proof collar assembly of claim 37 wherein said sliding member is a pair of conical bearing halves connected by a rod and wherein said pair of bearing halves are disposed in said lateral "V"-shaped groove.

39. The tangle-proof collar assembly of claim 30 wherein said flexible channel slotted topside and internal walls define an inverted "T"-shaped groove.

40. The tangle-proof collar assembly of claim 39 wherein said sliding member is a pair of cylindrical bearing halves connected by a rod and wherein said pair of bearing halves are disposed in said inverted "T"-shaped groove.

* * * * *